R. E. JORDAN.
HOG SCALDING, DEHAIRING, AND CLEANING MACHINE.
APPLICATION FILED JAN. 30, 1915. RENEWED MAR. 6, 1917.

1,301,450.

Patented Apr. 22, 1919.
5 SHEETS—SHEET 3.

R. E. JORDAN.
HOG SCALDING, DEHAIRING, AND CLEANING MACHINE.
APPLICATION FILED JAN. 30, 1915. RENEWED MAR. 6, 1917.

1,301,450.
Patented Apr. 22, 1919.
5 SHEETS—SHEET 5.

UNITED STATES PATENT OFFICE.

ROBERT E. JORDAN, OF CHICAGO, ILLINOIS, ASSIGNOR TO THE ALLBRIGHT-NELL COMPANY, OF CHICAGO, ILLINOIS, A CORPORATION OF ILLINOIS.

HOG SCALDING, DEHAIRING, AND CLEANING MACHINE.

1,301,450.     Specification of Letters Patent.   Patented Apr. 22, 1919.

Application filed January 30, 1915, Serial No. 5,168. Renewed March 6, 1917. Serial No. 152,875.

*To all whom it may concern:*

Be it known that I, ROBERT E. JORDAN, a citizen of the United States, and a resident of the city of Chicago, in the county of Cook and State of Illinois, have invented certain new and useful Improvements in Hog Scalding, Dehairing, and Cleaning Machines; and I do hereby declare that the following is a full, clear, and exact description of the same, reference being had to the accompanying drawings, and to the numerals of reference marked thereon, which form a part of this specification.

This invention relates to an improved type of hog dehairing machine wherein the carcasses are first introduced into a scalding tank and conveyed therefrom into the dehairing tank where the carcass is acted upon by dehairing mechanisms both while submerged and partially submerged, and finally positively conveyed therefrom into a rinsing tank and subjected to the brisk action of polishing brushes, which act to thoroughly rinse and clean the carcass with water at a different temperature.

It is an object, therefore, of this invention to convey a carcass through a number of stages of the dehairing machine wherein the mechanisms in each stage act efficiently to scrape, dehair and clean the carcass, the carcass, upon passing into the last stage of the machine, being subjected to the action of stiff polishing brushes operating upon the carcass while submerged and partially submerged in cold rinsing water.

It is also an object of this invention to construct a multi-stage hog dehairing machine into which the carcasses are introduced and rolled downwardly by gravity into the proper operating position of each stage of the machine and are there acted upon by dehairing mechanisms for a certain interval of time, and then subsequently conveyed upwardly into the field of action of other dehairing mechanisms and allowed to roll down by gravity into the next succeeding stage compartment, the carcasses being finally conveyed from the machine after a thorough cleaning and rinsing in the last stage.

It is also an important object of this invention to construct a multi-stage hog dehairing machine capable of operating on more than one carcass at the same time wherein the carcasses are caused to traverse a tortuous path through the machine, being elevated at times and at other times rolling downwardly by gravity into the field of the dehairing mechanism, and positively conveyed from stage to stage at certain intervals until the dehairing and polishing operations are completed.

It is also an object of this invention to construct a multi-stage dehairing machine wherein the carcass is advanced intermittently and at the same time rotated while acted upon by the dehairing mechanisms, certain of the same being adjustably mounted and counterweighed to permit the passage of carcasses beyond ordinary size.

It is furthermore an important object of this invention to construct a dehairing machine wherein a carcass is advanced intermittently upon an inclined conveyer, supported however on stationary means during its progress and subjected to the action of power driven dehairing means both while submerged and partially submerged in its progress through the machine.

It is finally an object of this invention to construct an efficient and improved form of multi-stage dehairing machine, the several stages co-acting upon a carcass so that the same when ejected is thoroughly cleaned, dehaired and polished.

The invention (in a preferred form) is illustrated in the drawings and hereinafter more fully described.

In the drawings:

Fig. 3 is a central vertical longitudinal section taken through the machine with parts shown in elevation.

Fig. 6 is a detail section taken on line 6—6 of Fig. 5

As shown in the drawings:

Figures 8, 9:
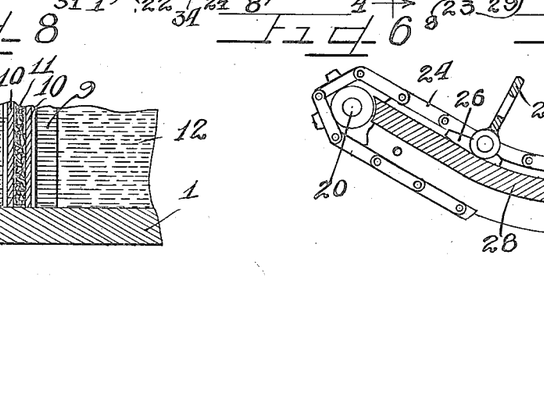
Fig. 8 is a longitudinal vertical detail section taken through the bottom of the tank and the partition at one end thereof, showing the construction.
Fig. 9 is a fragmentary top plan view of the tank and the mechanisms therein with the upper walls and mechanisms thereof omitted.
Figure 9:
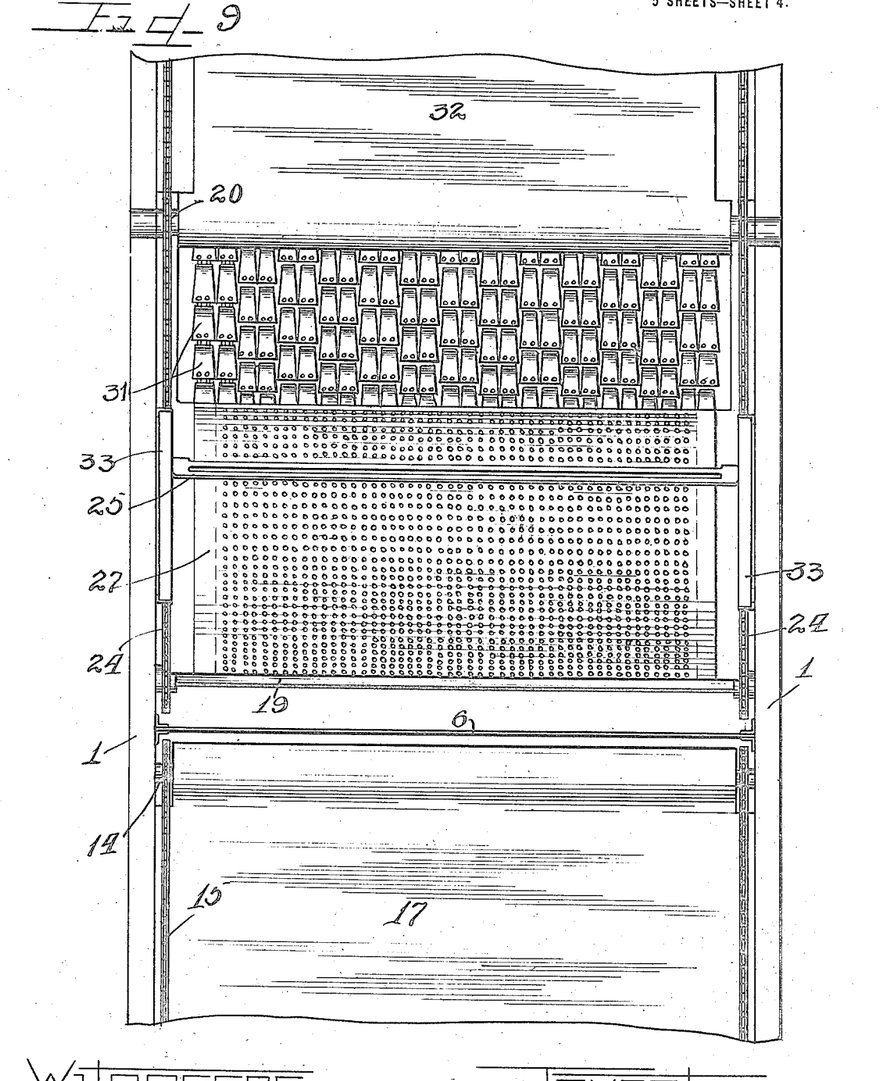
Figure 10:
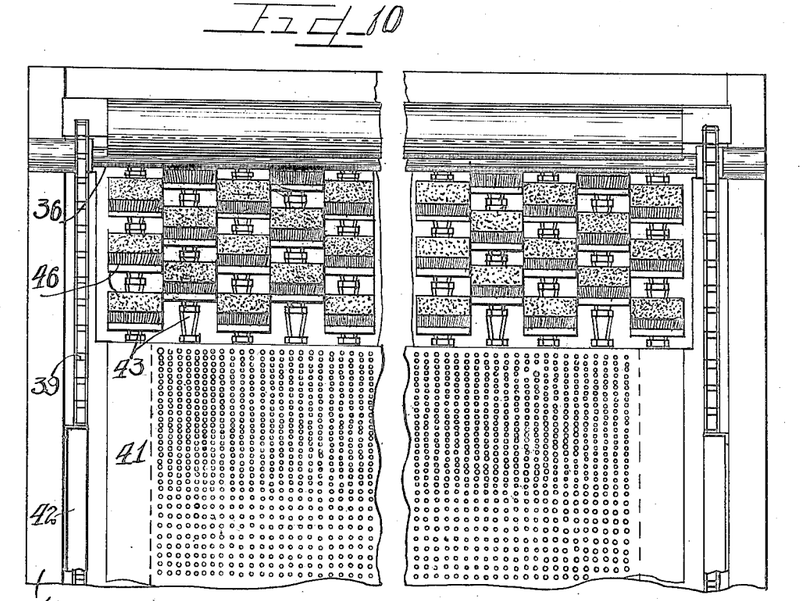
Fig. 10 is a similar fragmentary plan view taken at the rear end of the machine.
Figure 11:
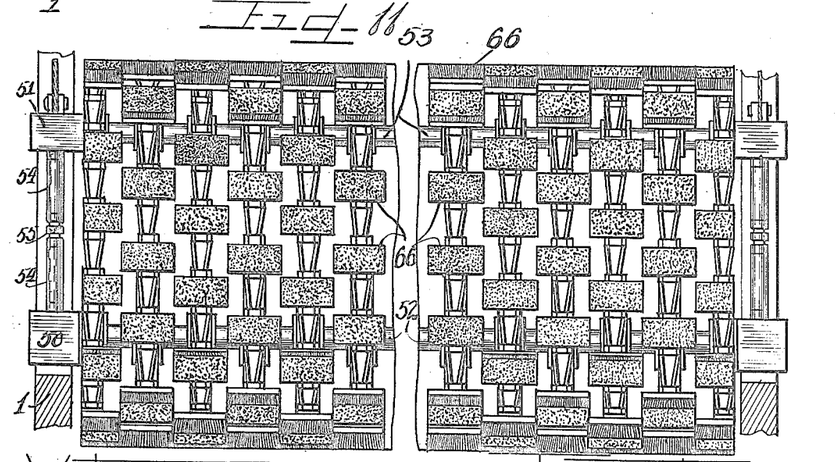
Fig. 11 is a fragmentary sectional view on line 11—11 of Fig. 3, with parts shown in elevation.

The hog scraping machine consists of a relatively long tank 1, with a super-structure built thereon from the rear end to near the front end of the tank embracing side walls 2 and 3, a top wall 4, and a front end wall 5, the rear end having no end wall by reason of the fact that it is through the opening thus provided that the dehaired and polished carcasses are discharged. This structure affords a frame for attachment and support of the operating mechanisms and other elements hereinafter described. A partition 6, extends transversely across the forward end of the tank 1, affording a scald water compartment 7, and the top of said partition, as clearly shown in Fig. 3, is slightly below the level of the water, so that a flow takes place into the dehairing compartment 8, on the other side of said partition. Near the rear end of said tank is another partition 9, forming one of the walls of said compartment 8, but this is an insulating partition as clearly shown in detail in Fig. 8, and consists of walls 10, with a filling of insulating material 11, therebetween to prevent the conduction of heat from the hot water compartment 8, to a cold rinse water compartment 12, formed at the rear of the tank.

Journaled in the lower forward end of the compartment 7, is a shaft 13, and at the upper end of said compartment adjacent the partition 6, is another shaft 14, and trained about sprocket wheels secured upon said shafts are conveyer chains 15, provided with transverse lags or bars 16. An inclined apron or floor 17, extends transversely across the tank within said compartment 7, and is disposed beneath the upper run of the conveyer chains 15, so that a carcass may rest thereon and be moved upwardly thereover by one of the lag bars 16. Journaled transversely in the tank in the forward end of the compartment 8, is a shaft 19, and above the water level in said compartment journaled in the walls of the super-structure thereover, are shafts 20 and 21, respectively, the latter near the second partition 9. Also journaled in said compartment 8, near the lower end thereof are shafts 22 and 23, respectively. Each of said shafts in said compartment 8, is provided with sprocket wheels around which continuous conveyer chains 24, are trained, said chains lying closely adjacent the side walls of the tank and having pivotally mounted thereon and extending transversely across the tank connecting said chains one to another, lag bars 25, which on that portion beneath the pivotal connection thereof with the chains, are provided with shoes 26.

Figure 5:
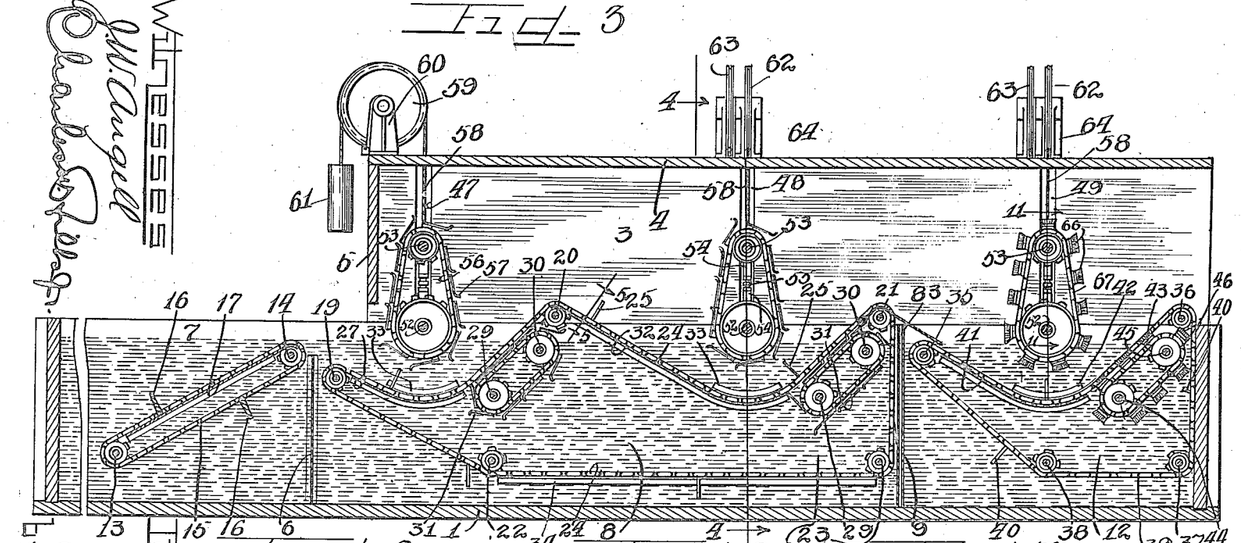
Fig. 5 is a detail section taken on line 5—5 of Fig. 3.
Figure 7:
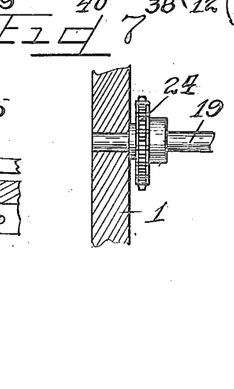
Fig. 7 is a detail section taken on line 7—7 of Fig. 1.

A perforated curved apron 27, extends transversely across the tank at the forward end of the compartment 8, beneath the conveyer chains leading off the sprocket wheels on the shaft 19. As clearly shown in Fig. 5, said perforated apron 27, is supported upon members 28, secured to the side walls of the tank, and on their upper surfaces grooved to receive slidably therein the shoes 26, of the lag bars 25, thus preventing said lag bars turning about their pivots on the chains. Also journaled transversely across the tank within the compartment 8, are two sets of shafts 29 and 30, the shafts 30, disposed at a higher level than the shafts 29, and being provided with sprocket wheels about which link belts are trained, and mounted upon said belts are a plurality of scraper blades 31.

The respective scraper blade elements are mounted adjacent an upwardly directed run of the conveyer chains 24, so that a carcass thrust upwardly by the lag bars 25, is supported and acted upon by said scraper blades 31, which are moving downwardly with respect thereto and opposite in direction to the travel of the conveyer chains. The flight of the conveyer chains 24, intermediate the respective sets of scraper mechanisms mounted upon the pairs of shafts 29 and 30, is inclined downwardly, as clearly shown in Fig. 3, and tracks upon supports on the side walls of the tank similar to the supports 28, described with reference to the first flight portion of said conveyer. As before a sheet metal apron, in the present instance denoted by the reference numeral 32, extends across the tank but as the sectioning will show in Fig. 3, said apron is only perforated near its lower curved end, and the upper unperforated portion of said apron extends above the water level and closely adjacent to the shaft 20, so that the carcasses received over said shaft 20, roll downwardly upon the apron 32, to the curved end thereof. Guiding members 33, are provided on the side walls of the tank in the compartment 8, directly above the curved portion of said respective aprons 27 and 32, and act to engage over the chains 24, at this point to hold the same downwardly upon the apron supporting means. The sprocket wheels on the shafts 22 and 23, merely act as idler means about which the under flight or return of the conveyer chains 24, is trained, although guiding supporting elements 34, which may preferably be angle bars secured to the side walls of the tank, are mounted in the lower portion of said compartment 8, to support the lower run of said chains, preventing the lags dragging upon the floor of the tank.

In the rear compartment 12, of the machine are journaled shafts 35, 36, 37, and 38, respectively, and each is provided with sprocket wheels about which continuous chains 39, are trained, provided with pivotally mounted lag bars 40, similar in construction to the lag bars 25, already described. A perforated curved sheet metal apron 41, extends across the tank within the compartment 12, and is mounted therein similarly to the aprons 32 and 27, already described, upon supports similar in construction to the supports 28. A curved guide member 42, is secured on each side of the walls of the compartment 12, and corresponds to the guide members 33, already described, acting to hold the conveyer chains 39, downwardly upon the supports for the apron 41.

Mounted in an inclined position within the rinsing compartment 12, is an inclined brushing and supporting mechanism comprising a link belt 43, trained about sprocket wheels secured upon shafts 44 and 45, there being a plurality of brushes 46, secured upon said link belt upon which the carcass is adapted to rest while being moved upwardly by the lag bars 40, toward the discharge opening.

The walls 2 and 3, of the super-structure are slotted, as indicated by the reference numerals 47, 48, and 49, at a plurality of points, said slots extending vertically from the top wall 4, to the side walls of the tank 1. Similarly constructed scraping and dehairing mechanisms are mounted in each of the slots 47 and 48, respectively, and consist of a vertically disposed carriage embracing bearing members 50 and 51, each pair of said bearing members having a shaft journaled therein extending transversely of the machine, the lower shaft being denoted by the reference numeral 52, and the upper shaft by the reference numeral 53. The upper pair of bearing members 51, is connected to the lower pair of bearing members 50, by means of vertically disposed tubular members 54, which are internally threaded and have engaged therein a right and left hand threaded connecting bolt 55, whereby the distance between said respective bearing members 50 and 51, may be changed. Said shafts 52 and 53, are provided with sprocket wheels and trained thereover is a link belt 56, on which a plurality of scraper blades 57, are mounted. Said scraper mechanisms are, as already mentioned, adjustably mounted in the machine, the supports therefor movable vertically in the respective slots, and for this purpose cables 58, are connected to the upper bearing members 51, and extend upwardly, each of the cables of the first mechanism at the forward end of the machine being trained about an idler sheave 59, journaled in a bracket 60, with a weight 61, attached upon the end of the cable.

The secondary scraper mechanism which is movable in the slot 48, is likewise supported upon the cables 58, which are trained about sheaves 62 and 63, mounted in brackets 64, and with weights 65, attached to the end of the cable and hanging downwardly on opposite sides of the machine. A similarly constructed mechanism is mounted at the rear end of the machine and movable in the slots 49, but in the latter instance the scraper blades 57, are replaced by brushes 66, mounted upon a link belt which, in the present instance, is denoted by the reference numeral 67.

All of said vertically adjustable counterweighted scraping and polishing mechanisms are driven from a common source, and for this purpose the respective shafts 53, are extended on one side of the machine, projecting through the slots in the walls thereof, and secured on the ends of said shafts are sprocket wheels 66$^a$. A continuous chain 67$^a$, is trained over the first and second sprocket wheels 66$^a$, and beneath an idler sprocket 68, and thence over another sprocket wheel 69, secured upon the end of the shaft 30, of the second set of inclined scraper mechanisms, there being a similar sprocket 69, mounted upon the shaft 30, of the first set. Said chain leads upwardly over the sprocket wheel 66$^a$, with a counterweight 70, supported by a sprocket wheel 71, hanging upon the flight of the chain between the sprocket wheel 69, and the last mentioned sprocket wheel 66$^a$. The chain is then trained around a small idler sprocket wheel 72, and thence around a sprocket wheel 73, upon the end of the shaft 45, and then downwardly beneath an idler sprocket 74, and upwardly over an idler sprocket 75, and beneath the first sprocket wheel 69, of the forward shaft 30, and finally around the sprocket wheel 66$^a$. Thus said continuous chain 67$^a$, serves to drive said vertically adjustable scraping and polishing mechanisms, as well as the inclined scrapers 31, and brushes 46. The conveyer chains 24 are driven from a separate source of power, and connections are provided therewith for driving the smaller auxiliary conveyer chains 15 and 39, respectively, from the main conveyer chains 24. For this purpose the shaft 21, is extended on one side of the machine through the side wall 3, thereof, and secured thereon is a sprocket wheel 76, adapted to receive a drive from any suitable source. Also secured upon said shaft 21, is a smaller sprocket wheel 77, and trained thereabout is a chain 78, which is also trained about a sprocket wheel 79, secured upon the extended end of the shaft 35, so that the conveyer chains 39, are thus driven from the shaft 21, of the conveyer chains 24. On the opposite side of the machine at the other end thereof a sprocket wheel 80, is secured upon the extended end of the shaft 19, and trained thereabout is a chain 81, which is also trained about a sprocket wheel 82, secured upon the extended end of the shaft 14, so that the conveyer chains 15, are driven from the shaft 19, which is driven by the conveyer chains 39.

The operation is as follows:

The carcasses to be dehaired are introduced into the compartment 7, of the machine, which is termed a scalding tank, and after soaking therein the proper length of time, are floated over the conveying mechanism so that the lag bars 16, may contact the carcass, thrusting the same upwardly on the apron 17, and discharging the same over the partition 6, into the dehairing and scraping compartment of the machine. The carcass as it passes over the partition 6, rolls downwardly upon the apron 27, into the pocket afforded thereby, and above which is mounted the adjustable scraping device comprising scraper blades upon the link belt 56. It is obvious that the latter mechanism, due to the counterweight 61, will be automatically adjusted dependent upon the size of the carcass, and will bear yieldingly thereupon while dehairing the same. The carcass remains in this first position, of course being rotated constantly by the scraper blades, until one of the lag bars 25, contacts the carcass and acts to thrust the same upwardly over the link belt, on which the scraper blades 31, are mounted, said blades of course moving in a direction opposite to that of the carcass, thus causing the same to rotate and further contributing to the dehairing action thereon. The carcass is finally moved to the elevated position above the shaft 20, and as it is thrust thereover by the lag bar 25, it rolls downwardly by gravity on the apron 33, into the second position in the compartment 8, the dehairing mechanisms of which are exactly similar to those described with respect to the first mentioned position of the carcass in said compartment.

Here again the carcass is acted upon by the scraper blades, revolving around the yieldably mounted carriage, and as a lag bar 25, moves into contact with the carcass, the same is moved upwardly over the scraper blades 32, on the second link belt 31, until the carcass is thrust upwardly and out of the water into a position above the shaft 21, and there is rolled over the partition 9, upon a small apron 83, and then rolls farther downwardly by gravity upon the apron 41, into a third position in the machine, the position of the hog being the same as that in the first and second positions already described. However, in the present instance the carcass is submerged or partially submerged in the cold rinse water of the compartment 12, and in place of the scraper blades acting thereon, the brushes 66, which are mounted upon a link belt trained about suitable rolls on a movable counterweighted carriage similar to that already described, act upon the upper surfaces of the rotating hog. Finally, as one of the lag bars 40, of the conveying mechanism in the compartment 12, engages behind the carcass, it is thrust upwardly at the same time resting upon the brushes 46, on the inclined link belt 43, which of course move oppositely to the direction of movement of the carcass, at the same time rotating the same.

Figure 1:
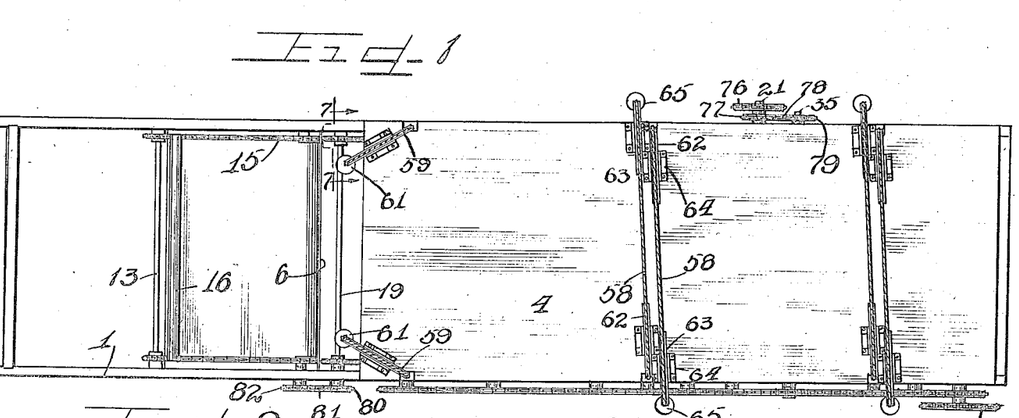
Figure 1 is a top plan view of a machine embodying the principles of my invention.
Figure 2:
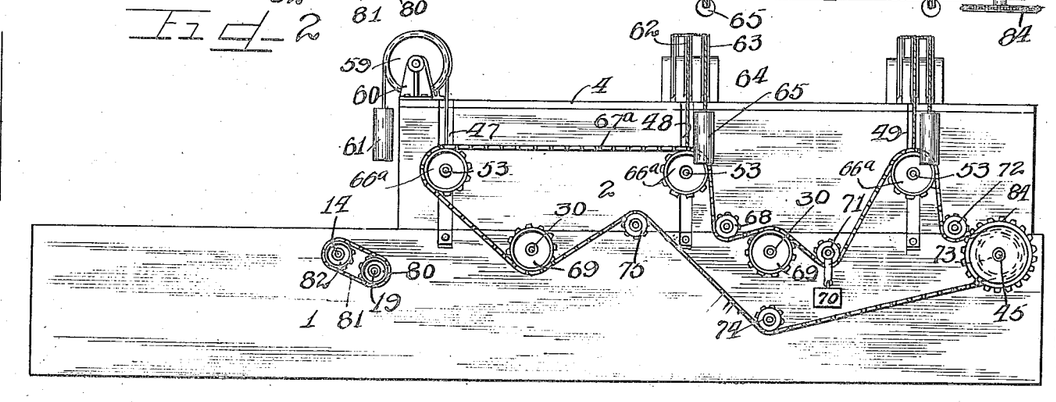
Fig. 2 is a side elevation thereof.
Figure 4:
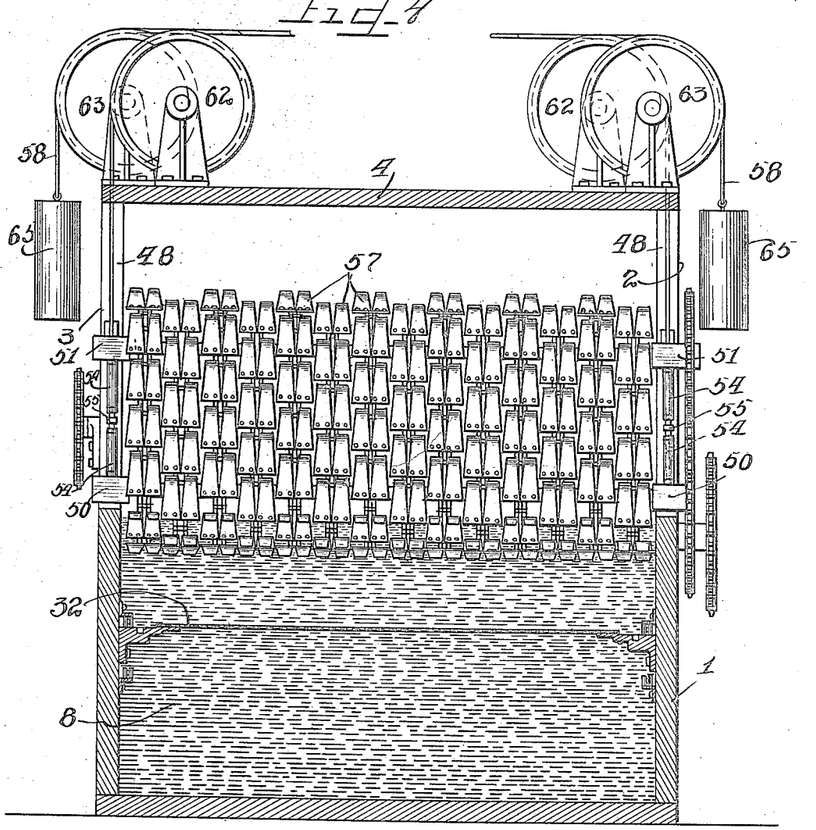
Fig. 4 is a transverse vertical section taken on line 4—4 of Fig. 3, with parts shown in elevation.

It is obvious that the carcass in the last stage of the machine is thoroughly rinsed, scrubbed and polished, and when discharged through the opening in the super-structure at the rear of the machine by one of the lag bars 40, of the conveyer chains 39, it is entirely free from hair and thoroughly cleaned. The main conveying mechanism in the compartment 8, serves by sprocket wheel and chain connections to also drive the conveying mechanism in the respective compartments 7 and 12, so that a synchronous operation of all of said conveying mechanisms is assured. All of the adjustable scraping and brush polishing mechanisms which are vertically movable in the superstructure of the machine, are driven by a continuous chain 67, as clearly shown in Fig. 2, and said chain is also trained about sprocket wheels on the end of the respective shafts 30 and 45, so that the inclined link belt scraper mechanisms in the compartment 8, and the similarly constructed brush mechanisms in the compartment 12, are simultaneously driven therewith independently of movement of the conveying means. A large sprocket wheel 84, is provided on the outer end of the shaft 45, by which a drive from any suitable source may be communicated thereto. It is obvious that the progress of a carcass through the machine is intermittent, that is, as it is conveyed to the elevated points in its path through the machine it rolls downwardly by gravity into the respective pockets in the field of operation of the scraping devices, and there remains until a lag bar contacts the same and elevates it to the next position. The direction of rotation of the vertically adjustable scraping and polishing mechanism is in a direction to assist the movement of the carcass through the machine, whereas the movement of the scraping and polishing mechanism upon which the carcass is partially supported as it is thrust along by the lag bars, is in a direction opposite to that of the carcass, so that the carcass is caused to rotate at a high rate of speed during all its positions of progress through the machine.

I am aware that the details of construction may be varied through a wide range without departing from the principles of this invention, and I therefore do not purpose limiting the patent granted otherwise than necessitated by the prior art.

I claim as my invention:

1. In a hog scraping machine of the class described, conveying mechanism disposed to effect an intermittent movement of a carcass through the machine, scraping and polishing mechanisms above said conveying mechanism acting automatically to adapt themselves to the carcasses of different size and to operate upon the carcasses while on said conveying mechanism, and secondary scraping and polishing mechanisms acting through said conveying mechanism during movement on said mechanisms and moving in a direction opposite to the movement of the carcass through the machine.

2. In a device of the class described, a conveying mechanism, curved means adapted to support a carcass during its movement thereon by said conveying mechanism, adjustable means bearing yieldably upon the carcasses to dehair the same while on said supporting means, and scraping mechanisms moving oppositely to the direction of movement of the carcass through the machine operating on the carcass while moved by said conveying mechanism and acting to rotate the carcass and dehair the same.

3. In a device of the class described a tank, a plurality of water compartments therein, communication between certain of said compartments permitting a flow of water therebetween, an insulating partition for one of said compartments for separating the fluid therein from the other compartments of the tank, conveying mechanisms, one within each of said compartments and operatively connected with one another for synchronous operation, said conveying mechanisms adapted to deliver carcasses from one to the other, and dehairing and polishing mechanisms associated with said compartments adapted to act upon the carcass during its progress through the machine.

4. In a machine of the class described a plurality of water compartments, a plurality of coöperative conveying mechanisms, one disposed within each of said compartments and said mechanisms adapted to deliver a carcass from one to another through the machine, operative connections between said mechanisms for driving the same synchronously, adjustably mounted scraping mechanisms disposed to operate upon a carcass while passed through the machine by said conveying mechanisms, and inclined stationary supporting means for the carcasses over which the carcasses are moved by said conveying mechanisms.

5. In a device of the class described a machine having a plurality of compartments containing water therein, conveying mechanisms in each of said compartments arranged to deliver from one to the other, submerged scraping mechanisms in one of said compartments and submerged polishing mechanism in another of said compartments adapted to operate upon a carcass delivered along by said conveying mechanisms, and scraping and polishing mechanisms adapted to operate upon a carcass moving through said compartments both during the time that the carcass is entirely and partially submerged.

6. In a machine of the class described means for effective a periodic elevation and an intermittent transfer of a carcass therethrough, and submerged scraping mechanism adapted to operate on a carcass.

7. In a machine of the class described mechanism effecting an intermittent transfer of a carcass through the machine, submerged dehairing means operating upon the carcass in the machine, and adjustably mounted dehairing mechanism adapted to move bodily toward and away from the carcass depending upon the size thereof while operating thereon.

8. In a machine of the class described a plurality of conveying mechanisms acting to effect an intermittent travel of a hog through the machine, submerged dehairing mechanism moving oppositely to the direction of movement of a carcass through the machine, and supporting the same thereon as the carcass is conveyed therepast, and power driven scraping mechanisms operating on the upper part of the carcass.

9. In a machine of the class described having means provided with a tortuous path therethrough for the travel of a carcass to be cleaned, conveying and supporting mechanism for effecting an intermittent travel of the carcass through the machine, scraping means moving oppositely to the direction of movement of the carcass operating on the under side thereof during movement of said carcass on an upward portion of said tortuous path, and scraping devices acting upon the upper surface of the carcass at different points in the travel thereof through the machine.

10. In a machine of the class described a plurality of water compartments, one thereof insulated from the others, carcass conveying mechanisms in each of said compartments delivering one to the other, means submerged in said compartments acting upon a carcass to dehair and polish the same during its travel through the machine, and scraping and polishing devices operating upon the upper side of the carcass in the direction of travel thereof through the machine.

11. In a hog dehairing and cleaning machine means for intermittently elevating and conveying a carcass in the machine, scraping devices, and polishing mechanisms submerged in water within the machine to clean and polish the carcass after scraping operations thereon, said scraping devices and polishing mechanisms operating on the carcass as it is transferred through the machine.

12. In a machine of the class described a plurality of compartments, conveying mechanisms in each of said compartments delivering one to the other, scraping and polishing mechanisms submerged within water in said compartments to operate on a carcass moved by said conveying mechanisms, and scraping and polishing mechanisms disposed above said conveying mechanisms and movable toward and away from the carcass to be cleaned, according to the size thereof.

13. In a device of the class described a tank embracing a plurality of compartments, conveying and supporting mechanisms in each thereof delivering one to the other and coacting to effect a transfer of the carcass through the machine, a plurality of scraping and polishing supporting mechanisms for the carcass within certain of said compartments to operate on a carcass on said conveying and supporting mechanisms, scraping mechanisms mounted above said compartments also acting upon a carcass moved by said conveying mechanism, and driving connections between said last mentioned scraping mechanisms and said scraping and polishing supporting means within the machine.

14. In a device of the class described a plurality of compartments, conveying mechanisms therein for effecting a transfer of the carcass from one compartment to the other, scraping devices acting upon the carcass while in one of said compartments, polishing mechanisms acting upon the carcass in another of said compartments, and scraping and polishing means in said compartments submerged beneath the surface of the water therein and operatively connected with said respective scraping and polishing mechanisms coacting therewith in dehairing and polishing a carcass.

15. In a dehairing machine of the class described, an elevator to carry a carcass upwardly thereon, means to receive the carcass discharged thereto from said elevator comprising stationary supporting means, said supporting means adapted to permit rolling of the carcass supported thereon and to permit advancement of the carcass therealong and dehairing devices flexibly mounted and acting on the under side of the carcass.

16. In a dehairing machine of the class described, a scald tank, an elevator to elevate a carcass therefrom, dehairing means to act on the carcass discharged downwardly by gravity thereto, said means comprising flexibly mounted separate scraper elements adapted to operate along the under surface of the carcass transversely for the entire length thereof.

17. In a dehairing machine of the class described the combination with a scald tank, and an elevator to carry a carcass upwardly therefrom, of dehairing means to act on the carcass discharged thereto from said elevator whereby the carcass rolls downwardly into the field of operation of said dehairing means by gravity, said means comprising a plurality of separate scraper elements each flexibly mounted and operating on the under surface of the carcass simultaneously along the entire length thereof.

18. In a machine of the class described, a scald tank, an elevator for carrying a carcass upwardly thereon out of said scald tank, a stationary support, dehairing means to receive the carcass discharged thereto along on said support from said elevator, the carcass rolling downwardly by gravity on said support toward the field of operation of said dehairing means, said means comprising flexibly mounted individual scraper elements operating transversely on the under surface of the carcass for the entire length thereof.

19. In a machine of the class described, a scald tank, an elevator for moving a carcass upwardly therefrom, dehairing means adapted to act on a carcass discharged thereto from said elevator, said means comprising in part flexibly mounted individual scraper elements operating transversely on a carcass for the entire length thereof, as the carcass is caused to advance thereover.

20. In a machine of the class described, an elevator for elevating a carcass, dehairing means to receive hogs discharged thereto from said elevator, said means embracing individual flexibly mounted scraper elements operating on the under surface of a carcass, and mechanism for elevating a carcass out of the field of operation of the scraper elements.

21. In a dehairing machine of the class described, a scald tank, an elevator to elevate a carcass therefrom, dehairing mechanism adapted to act on a carcass discharged downwardly thereto by gravity from said elevator, and means for elevating a carcass into the field of operation of the dehairing mechanism with a part of said dehairing mechanism operating upwardly on the underside of a carcass positively advanced thereover.

22. In a machine of the class described, a scald tank, an elevator for elevating a carcass therefrom, dehairing means adapted to act on a carcass discharged thereto from said elevator, said means comprising partially submerged scrapers acting transversely on a hog for the entire length thereof as the carcass is conveyed thereover, dehairing mechanisms operating over the upper surface of the carcass in the direction of movement thereof through the machine, and means for effecting a timed intermittent conveyance of the carcass through the machine subjected to the operation of said dehairing means and mechanisms.

23. In a machine of the class described, a scald tank, an elevator for elevating a carcass therefrom, dehairing means partially submerged adapted to act on a carcass discharged from said elevator downwardly thereto by gravity, said means comprising in part flexibly mounted partially submerged scraper elements operating upwardly and transversely of the carcass on the under surface thereof for the entire length of the carcass as the carcass is conveyed thereover, and adjustable dehairing mechanism adapted to operate on the upper surface of the carcass transversely thereof.

24. In a machine of the class described, a scald tank, an elevator for elevating a carcass therefrom, dehairing means adapted to act on a carcass discharged by gravity thereto from said elevator, said means comprising scraper elements adapted to operate on the under surface of the carcass contrary to the direction of movement of the carcass through the machine, means conveying a carcass past said means, and dehairing mechanisms forming a part of said dehairing means adapted to operate on the upper surface of the carcass in the direction of movement of the carcass through the machine and transversely of the carcass for the entire length thereof.

25. In a machine of the class described, a conveyer for advancing the carcasses, and scraping mechanism acting upwardly through the conveyer to scrape and rotate the carcasses.

26. In a machine of the class described, a conveyer for the carcasses, and scraping mechanisms acting through the conveyer upwardly on carcasses carried thereby.

27. In a machine of the class described, means for conveying a carcass through the machine and intermittently submerging the carcass in its passage therethrough.

28. In a machine of the class described, partially submerged mechanism for conveying a carcass through the machine and intermittently submerging the carcass, and scraper devices acting upon the carcass during its passage through the machine.

29. In a machine of the class described, a conveyer for conveying a carcass with an intermittent movement through the machine, and intermittently submerging it, and mechanism for dehairing the carcass during its passage through the machine.

30. In a machine of the class described, continuously movable means conveying a carcass with an intermittent movement through the machine and partially submerging the carcass, dehairing elements operating on the carcass while the same is submerged, and scraper means adapted to operate upon a carcass as it is moved upwardly from submerged position.

31. In a machine of the class described, mechanism for conveying a carcass with an intermittent movement through the machine, and at each intermission of movement causing submersion of the carcass, scraping devices operating over the carcass at each intermission of movement, and contrary to the direction of rotational movement of the carcass, and dehairing means operating upon the carcass between the periods of intermittent movement thereof as it is conveyed along.

32. In a machine of the class described, mechanism for conveying a carcass therethrough with an intermittent movement, and completely submerging the carcass at each period of intermission of movement thereof through the machine.

33. In a machine of the class described, mechanism for conveying a carcass through a machine with an intermittent movement, and permitting rotation of the carcass at each intermission of movement, and submerging the carcass intermittently in its passage through the machine.

34. In a machine of the class described, mechanism for conveying a carcass intermittently therethrough and at each period of intermission permitting rotation of the carcass, and intermittently submerging the carcass during its progress through the machine, dehairing devices operating upon the carcass at each period in the intermission of movement thereof, and dehairing means operating contrary to movement of the carcass as it is conveyed through the machine.

35. In a machine of the class described, conveying mechanism for conveying a carcass through a machine and intermittently submerging the carcass, dehairing devices operating upon the carcass at the period of submergence thereof, said devices operating transversely of the carcass in the direction of movement thereof through the machine, and dehairing means operating beneath a carcass contrary to the direction of movement thereof through the machine as the carcass is conveyed upwardly from submerged position.

36. In a machine of the class described, means for conveying a carcass through the machine in a tortuous path with an intermittent movement and intermittently submerging the carcass.

37. In a machine of the class described, mechanism effecting an intermittent elevation of a carcass in its passage through the machine and moving the carcass intermittently through the machine, and causing the carcass to be submerged at each intermission period in the movement of the carcass through the machine.

38. In a machine of the class described, mechanism for effecting an intermittent movement of a carcass therethrough, intermittently submerging the carcass in its passage through the machine, adjustable scraping devices adapted to operate upon the carcass at each period of intermission in the movement thereof through the machine, and scraping devices adapted to operate beneath the carcass contrary to the movement thereof through the machine as the carcass is conveyed through the machine.

39. In a machine of the class described, a scald tank, means elevating a carcass therefrom, mechanism adapted to receive a carcass discharged thereto from said means and effecting an intermittent moving of the carcass and intermittently submerging the carcass, dehairing devices for operating upon a carcass during a period of submergence thereof, other dehairing devices for operating upon a carcass as it is moved upwardly out of submerged position, and partially submerged polishing and cleaning devices adapted to operate upon a carcass discharged thereto from said dehairing devices.

40. In a machine of the class described, mechanism for conveying a carcass in a tortuous path with an intermittent movement through the machine and intermittently submerging the carcass during its movement through the machine, and means operating upon the carcass to dehair and clean the same in its passage through the machine.

41. In a carcass scraping machine, a scalding tank, a conveyer adapted to pick up carcasses therefrom and advance them, and flexible beaters and scrapers acting upwardly through the conveyer on the carcasses as they are carried therepast.

42. In a device of the class described, a conveyer loosely carrying carcasses thereon, and dehairing mechanism acting through the conveyer on the carcasses to rotate and dehair the carcasses.

43. In a dehairing machine of the class described, a frame, a curved stationary support mounted therein, flexibly mounted scraper devices operating beneath a carcass transversely thereof and along the entire length of the carcass and rolling the carcass as the carcass moves thereover, and mechanism for elevating a carcass for discharge by gravity downwardly into said frame.

44. In a dehairing and cleaning machine, a conveyer having openings therein, and scraping mechanisms rotatable under the conveyer adapted to act upwardly through the openings in the conveyer to dehair and clean a carcass carried on the conveyer.

45. In a device of the class described, a conveyer having openings therethrough, means attached to the conveyer for positively moving a loosely supported carcass, and scraping mechanisms acting through the conveyer on said positively moving carcass to scrape and rotate the carcass.

46. In a dehairing machine, a conveyer for loosely supporting a carcass, and dehairing mechanism positioned beneath the conveyer and acting upwardly through the conveyer to dehair the carcass and continuously rotate the same while dehairing.

47. In a dehairing machine, means for loosely supporting and conveying a carcass, and dehairing mechanism acting upwardly through said means for dehairing the carcass.

48. In a machine, dehairing mechanism adapted to dehair, and rotate a carcass, and means for pushing the carcass over said dehairing mechanism.

49. In a dehairing machine, mechanism acting to elevate and rotate a carcass and to simultaneously dehair the same, and mechanism for pushing the carcass past the aforesaid mechanism during the operation thereof.

50. In a machine of the class described, a conveyer, and scraping mechanisms acting upwardly through the conveyer transversely on a carcass being carried therepast.

In testimony whereof I have hereunto subscribed my name in the presence of two subscribing witnesses.

ROBERT E. JORDAN.

Witnesses:
  CHARLES W. MILLS, Jr.,
  FRANK K. HUDSON.